US007367284B2

(12) United States Patent
Gorans

(10) Patent No.: US 7,367,284 B2
(45) Date of Patent: *May 6, 2008

(54) AUTOMATED POULTRY PROCESSING METHOD AND SYSTEM

(75) Inventor: Marc S. Gorans, Willmar, MN (US)

(73) Assignee: Nova-Tech Engineering, Inc., Willmar, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/438,404

(22) Filed: May 22, 2006

(65) Prior Publication Data

US 2006/0207519 A1 Sep. 21, 2006

Related U.S. Application Data

(63) Continuation of application No. 10/804,273, filed on Mar. 19, 2004, now Pat. No. 7,066,112, which is a continuation-in-part of application No. 10/702,370, filed on Nov. 6, 2003, now Pat. No. 7,004,112.

(51) Int. Cl.
*A01K 45/00* (2006.01)

(52) U.S. Cl. .................................. 119/713; 119/843

(58) Field of Classification Search ................ 119/6.8, 119/713, 714, 716, 843; 452/153, 157
See application file for complete search history.

(56) References Cited

U.S. PATENT DOCUMENTS

| 2,713,325 | A |  | 7/1955 | Bowers |  |
|---|---|---|---|---|---|
| 3,774,578 | A |  | 11/1973 | Randolph et al. |  |
| 3,994,292 | A |  | 11/1976 | Goodwin |  |
| 4,375,814 | A |  | 3/1983 | Gourlandt |  |
| 4,417,663 | A |  | 11/1983 | Suzuki |  |
| 4,446,819 | A |  | 5/1984 | Gourlandt |  |
| 4,627,007 | A | * | 12/1986 | Muschany | ................... 452/157 |
| 4,951,610 | A |  | 8/1990 | Gourlandt |  |
| 5,195,925 | A |  | 3/1993 | Gorans et al. |  |
| 5,326,311 | A | * | 7/1994 | Persoon et al. | ............. 452/184 |
| 5,651,731 | A |  | 7/1997 | Gorans et al. |  |
| 6,029,080 | A |  | 2/2000 | Reynnells et al. |  |
| 6,032,612 | A |  | 3/2000 | Williams |  |
| 6,149,956 | A |  | 11/2000 | Boerjan |  |
| 6,396,938 | B1 |  | 5/2002 | Tao et al. |  |

(Continued)

FOREIGN PATENT DOCUMENTS

EP 0 819 381 A1 1/1998

(Continued)

*Primary Examiner*—Rob Swiatek
(74) *Attorney, Agent, or Firm*—Mueting, Raasch & Gebhardt, P.A.

(57) ABSTRACT

Poultry processing methods and systems that provide for the processing of poultry at a plurality of processing stations, with the poultry being transferred between stations using an automated conveying system. Each individual poultry is retained in a poultry carrier designed to be conveyed by the automated conveying system. Each of the poultry carriers is preferably designed to retain only one individual poultry at a time. The systems and methods may also include identification tags that may be used to direct the poultry through the processing system with the automated conveying system. The identification tags may be associated with the poultry themselves or they may be associated with the poultry carriers.

32 Claims, 5 Drawing Sheets

U.S. PATENT DOCUMENTS

| | | |
|---|---|---|
| 6,443,102 B1 | 9/2002 | Schepers et al. |
| 6,512,839 B1 * | 1/2003 | Toelken ................ 382/110 |
| 6,609,479 B2 * | 8/2003 | Storer et al. ............. 119/716 |
| 6,634,319 B1 | 10/2003 | Zermoglio et al. |
| 7,004,112 B2 | 2/2006 | Gorans |
| 7,066,112 B2 * | 6/2006 | Gorans ................. 119/713 |
| 2001/0035370 A1 | 11/2001 | Yavnai et al. |
| 2005/0120974 A1 | 6/2005 | Gorans |

FOREIGN PATENT DOCUMENTS

| | | |
|---|---|---|
| EP | 0 890 838 A1 | 1/1999 |
| EP | 0 890 838 B1 | 3/2002 |
| WO | WO 00/01302 A1 | 1/2000 |
| WO | WO 02/083848 A2 | 10/2002 |
| WO | WO 02/083848 A3 | 10/2002 |

* cited by examiner

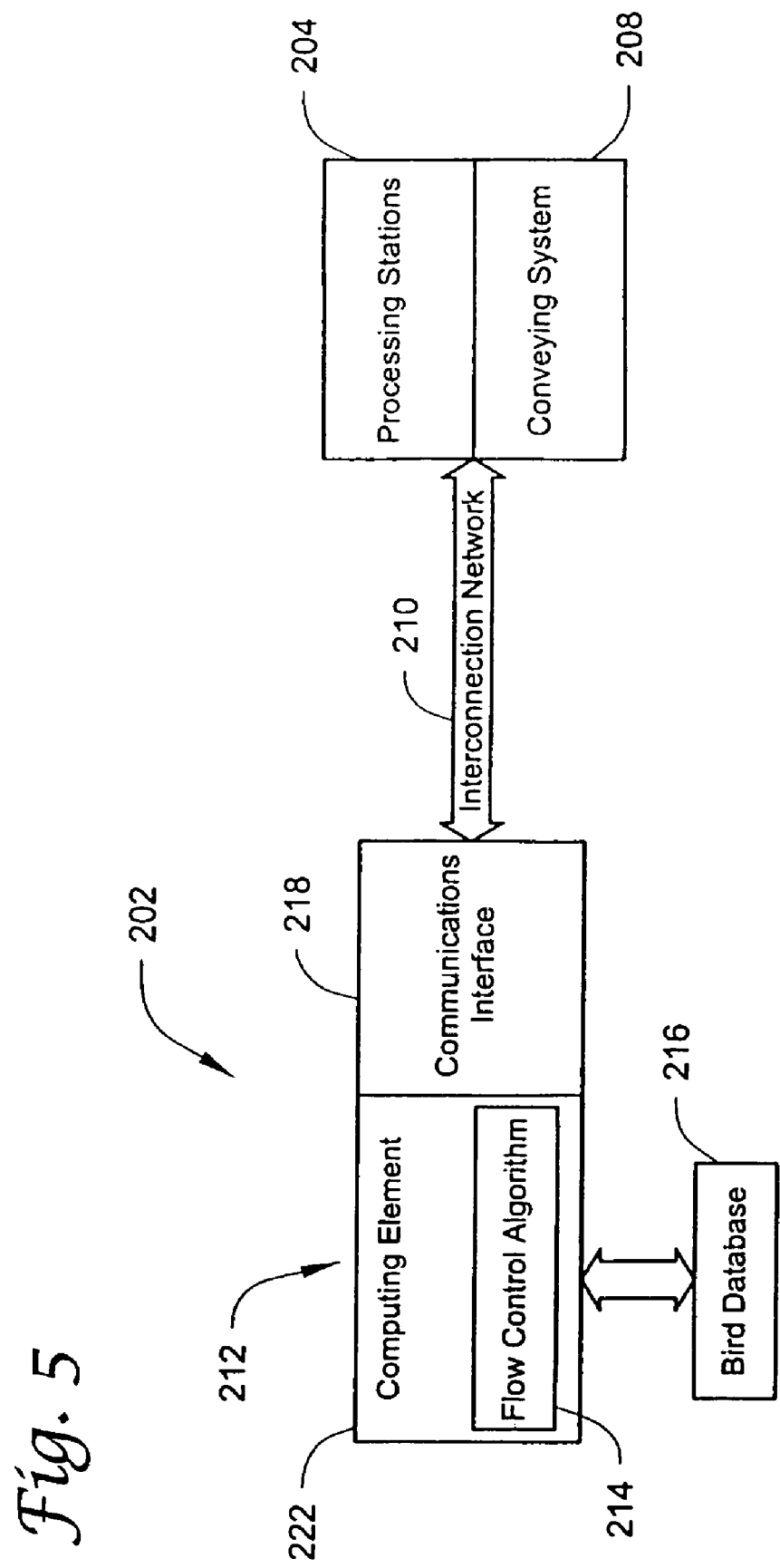

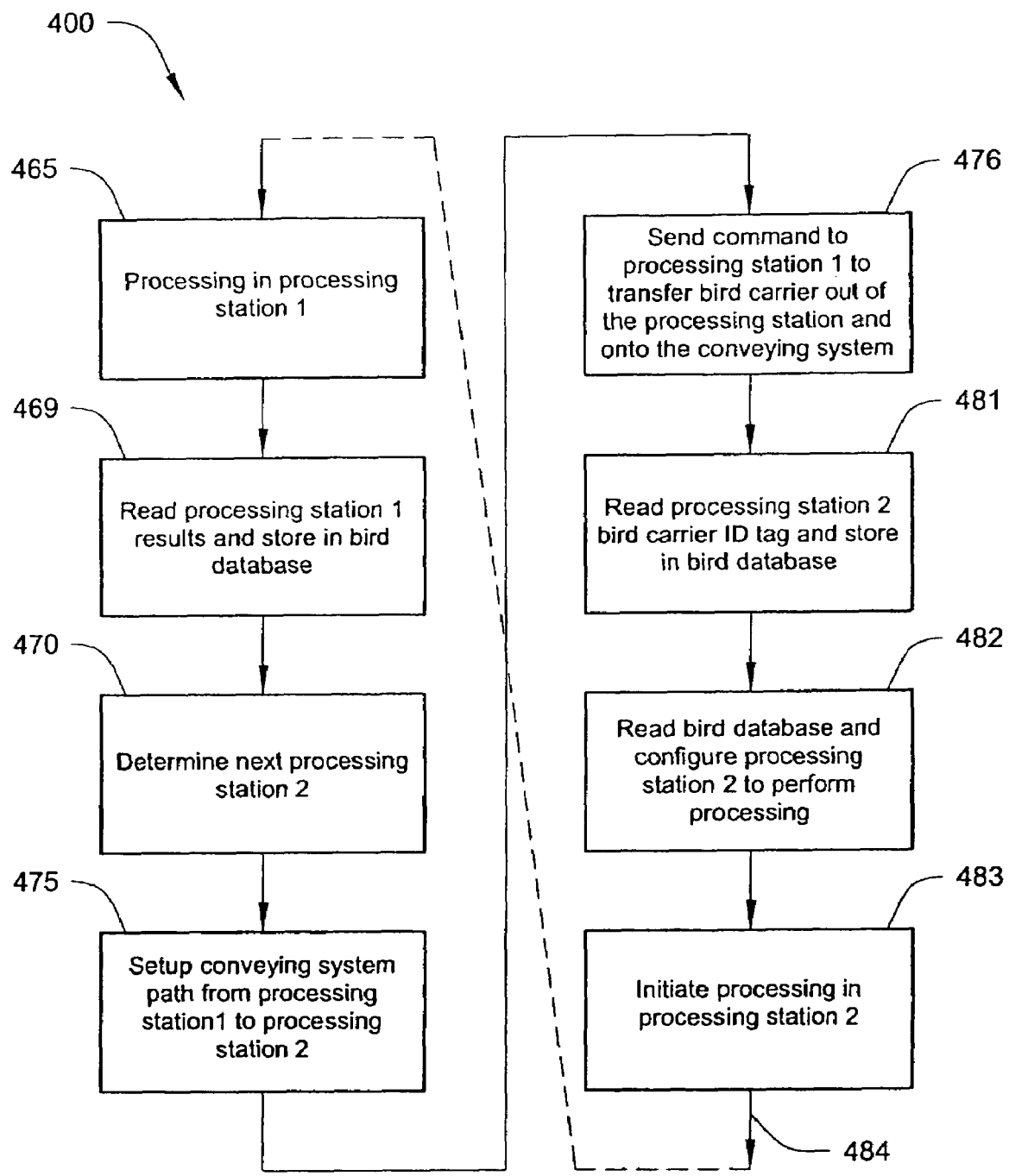

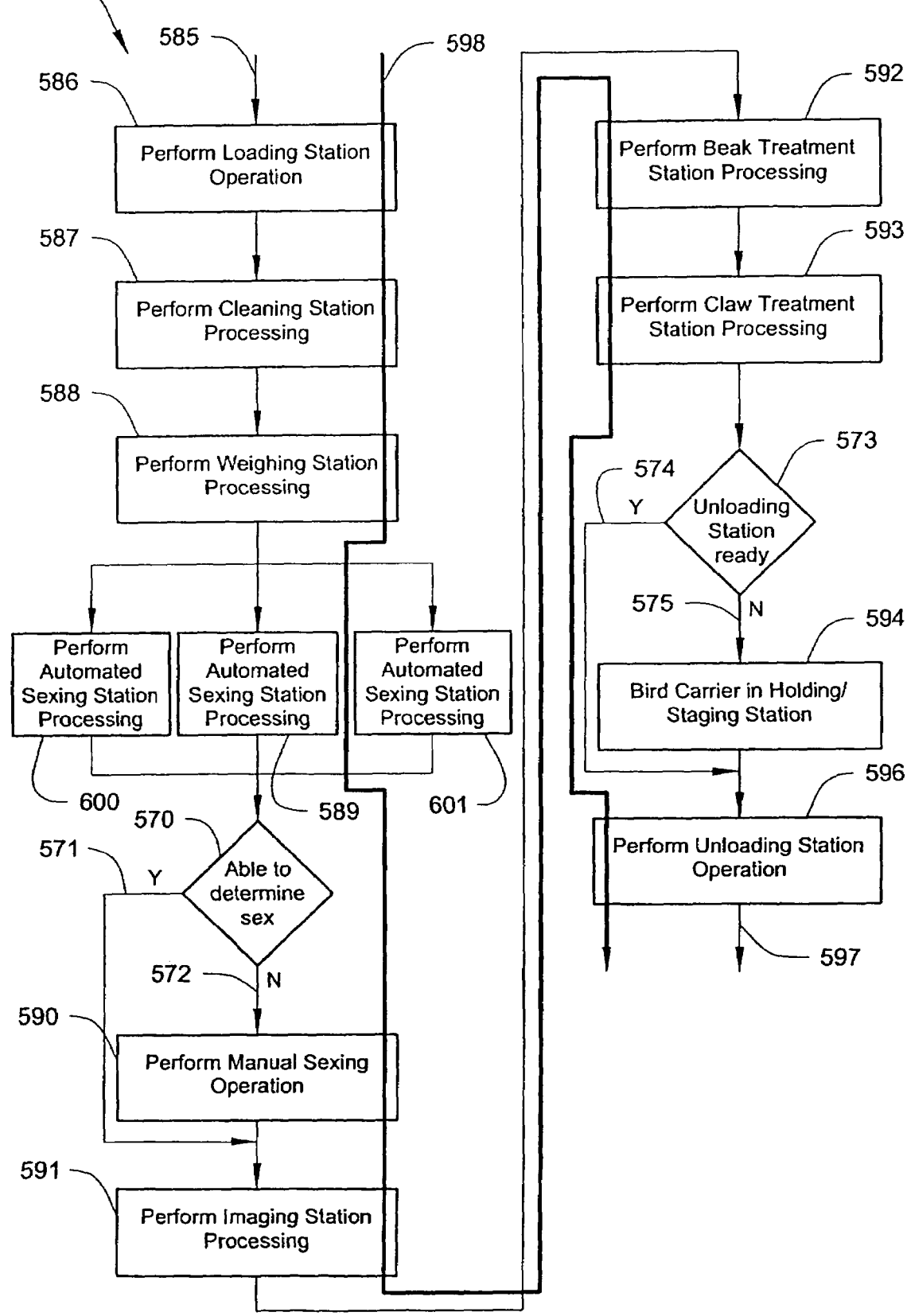

AUTOMATED POULTRY PROCESSING METHOD AND SYSTEM

RELATED APPLICATIONS

This is a continuation application of U.S. patent application Ser. No. 10/804,273, titled AUTOMATED POULTRY PROCESSING METHOD AND SYSTEM, filed 19 Mar. 2004, now (U.S. Pat. No. 7,066,112) which is a continuation-in-part application of U.S. patent application Ser. No. 10/702,370 titled AUTOMATED HATCHLING PROCESSING METHOD AND SYSTEM, filed Nov. 6, 2003, now issued as U.S. Pat. No. 7,004,112, which are hereby incorporated by referenced in their entirety.

BACKGROUND

The present invention relates generally to a method and system for processing poultry (either hatchlings or embryos in eggs), where "hatchlings" are defined as young birds (e.g., chickens, turkeys, ducks, geese, etc.) with an age of one week or less. Furthermore, "poultry" as used herein means one or more hatchlings or one or more embryos in eggs. In some instances, it may be preferred that the methods or systems of the present invention be dedicated to processing hatchlings or embryos in eggs, but not both hatchlings and embryos in eggs.

The processing of poultry may include activities such as sexing to determine gender, inoculating or otherwise medicating the poultry, feeding the hatchlings, weighing the poultry, treating the beaks and/or claws of the hatchlings (to, e.g., retard their growth), etc. Conventionally, poultry (hatchlings or eggs) are handled manually, i.e., individuals must physically hold the poultry and either perform the process while holding the poultry or load the poultry into equipment in which one of the processes is performed.

SUMMARY OF THE INVENTION

The poultry processing methods and systems of the present invention provide for the processing of poultry at a plurality of processing stations, with the poultry being transferred between stations using an automated conveying system. Each individual poultry is retained in a poultry carrier designed to be conveyed by the automated conveying system. Each of the poultry carriers is preferably designed to retain only one poultry (hatchling or embryo in an egg) at a time.

The systems and methods of the present invention also include identification tags that may be used to direct the poultry through the processing system with the automated conveying system. The identification tags may be associated with the poultry themselves or they may be associated with the poultry carriers. Identification tags may take any suitable form, including but not limited to bar codes, radio frequency identification (RFID) tags, alphanumeric indicia, etc. In some systems/methods, the identification tag may not be embodied in a physical form, e.g., the identification tag may be provided in software only. The identification tags may be based, at least in part, on one or more characteristics of the poultry they identify (e.g., weight, gender, age, species, etc.) or they may be assigned without consideration for any physical characteristic of the particular poultry.

The methods and systems of the present invention also involve transporting each loaded poultry carrier between the processing stations using an automated conveying system connecting the processing stations. As used herein, an "automated conveying system" means a conveying system that is capable of transporting poultry between processing stations without direct human intervention, i.e., the automated conveying system does not require a human to carry or otherwise transport the poultry between processing stations.

The methods further involve the determination of a processing sequence for individual poultry. The processing sequence is a selection of the processing stations at which individual poultry is to undergo processing. For example, some poultry may be processed at only some of the available processing stations in a given processing system. In other instances, the processing sequence may involve a selection of the type of processing that may be performed at a given processing station where, for example, the processing of particular poultry may change based on weight, age, gender, etc. As a result, the processing sequences for at least two different poultry will differ in the methods of the present invention.

The processing sequences may be determined as the poultry enters the system, i.e., before it is processed at the processing stations. In other instances, one or more characteristics of the poultry may be identified (e.g., egg weight, hatchling weight, age, gender, species, etc.) at one or more processing stations before selecting the remaining processing stations of the individual poultry processing sequence. As a result, one or more of the subsequent processing stations can be selected based on the identified characteristics of specific poultry.

Collection of data regarding the physical characteristics may preferably be performed at processing stations that may be characterized as "data collection stations." A data collection station of the present invention is a processing station at which data regarding one or more physical characteristics of specific poultry may be obtained. Examples include, but are not limited to, weighing stations, sexing stations, imaging stations, etc. The processing systems and processing sequences of the present may preferably include at least one data collection station. The data collection stations may preferably be located at any point within the system or, for methods, may preferably be accessed at any time during processing of specific poultry.

In contrast to data collection stations, the systems/methods of the present invention may also preferably include "functional stations." A functional station of the present invention is a processing station at which the poultry is changed in one or more aspects. Examples include, but are not limited to, beak treatment stations, claw treatment stations, marking stations, cleaning stations, gavage stations, inoculation stations, etc. The processing systems and processing sequences of the present may preferably include at least one functional station. The functional stations may preferably be located at any point within the system or, for methods, may preferably be accessed at any time during processing of the poultry.

Although processing stations may be identified as "data collection stations" or "functional stations," a single processing station may be both a data collection station and a functional station. For example, it may be possible to both clean and weigh poultry at a single processing station. Many other combinations of data collection and functional stations are possible within the scope of the present invention.

The processing sequences of the present invention may be identified as the poultry passes through the processing system. In other words, selection of the processing stations at which specific poultry is to undergo processing may be made as the specific poultry reaches each particular station. Such a method may involve encoding information regarding one or more characteristics of the poultry in the identification tag associated with the poultry or storing such information in a database location associated with the particular poultry. In either case, a decision as to the processing of specific poultry at a particular processing station is made on an as-needed basis, i.e., as the poultry approaches or is located within the processing station.

The processing methods and systems may be organized serially such that each individual poultry passes through every processing station in the system. In such a system, the processing stations may or may not be activated as each individual poultry passes through the processing station depending on whether the specific poultry is to undergo the process performed at that station. Alternatively, the processing methods and systems may be organized in parallel such that poultry in the poultry carriers can be directed to bypass processing stations that perform processes that are not selected for those particular poultry using the automated conveying system. In another variation, some of the processing stations can be arranged serially while other processing stations may be arranged in parallel.

As discussed herein, it may be desirable to store information regarding each individual poultry in a database or in the identification tag associated with each individual poultry. Encoding information regarding each individual poultry into the identification tag associated with the poultry can be useful in processing where, for example, the information is read or retrieved at a later time to determine whether individual poultry should be processed at that station or what type of processing should be performed at that particular station. A potential advantage of a centralized database is that data on the individual poultry may potentially be retrieved at a later time for trend analysis, quality control, etc.

In one aspect, the present invention provides a method for processing poultry by loading individual poultry into each poultry carrier of a plurality of poultry carriers to provide a plurality of loaded poultry carriers, wherein each loaded poultry carrier is capable of restraining only one individual poultry at a time; determining a processing sequence in a processing system that includes a plurality of processing stations for each loaded poultry carrier, wherein determining the processing sequence includes selecting two or more of the processing stations at which the poultry will undergo processing; processing the individual poultry in each of the loaded poultry carriers in the two or more selected processing stations of the processing sequence; and transporting each loaded poultry carrier between the two or more processing stations using an automated conveying system connecting the plurality of processing stations; wherein each poultry carrier includes an identification tag associated therewith; and wherein the processing sequences for two or more of the loaded poultry carriers are different.

In another aspect, the present invention provides a method for processing poultry by loading individual poultry into each poultry carrier of a plurality of poultry carriers to provide a plurality of loaded poultry carriers, wherein each loaded poultry carrier is capable of restraining only one individual poultry at a time; assigning an identification tag to each poultry carrier; determining a processing sequence in a processing system that includes a plurality of processing stations for each loaded poultry carrier, wherein determining the processing sequence includes selecting two or more of the processing stations at which the individual poultry will undergo processing, wherein the plurality of processing stations includes at least one data collection station at which poultry data is collected and at least one functional station at which poultry is changed, and further wherein selecting two or more of the processing stations at which the individual poultry will undergo processing includes selecting at least one data collection station and at least one functional station; identifying a characteristic of each individual poultry in the loaded poultry carriers, wherein determining the processing sequence is at least partially based on the identified characteristic of the individual poultry in the loaded poultry carrier; processing the individual poultry in each of the loaded poultry carriers in the two or more selected processing stations of the processing sequence; and transporting each loaded poultry carrier between the two or more processing stations using an automated conveying system connecting the plurality of processing stations; wherein the processing sequences for two or more of the loaded poultry carriers are different.

In another aspect, the present invention provides an automated poultry processing system that includes a plurality of processing stations including at least one data collection station capable of collecting data regarding individual poultry and at least one functional station capable of changing the individual poultry; an automated conveying system connecting the plurality of processing stations; a plurality of poultry carriers adapted to travel along the automated conveying system between the plurality of processing stations, wherein each poultry carrier is capable of restraining only one individual poultry at a time; an identification tag associated with each poultry carrier of the plurality of poultry carriers; and a control system operatively connected to the automated conveying system and the plurality of processing stations, the control system routing the plurality of poultry carriers along the automated conveying system and activating the plurality of processing stations as needed.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF THE DRAWINGS

FIG. 5 illustrates one embodiment of a control system for use in connection with the present invention.

FIG. 6 illustrates one embodiment of a general flow control algorithm shown in FIG. 5.

FIG. 7 is a flow diagram illustrating one embodiment of a flow control algorithm and a related processing sequence.

DETAILED DESCRIPTION OF ILLUSTRATIVE EMBODIMENTS OF THE INVENTION

Figure 1:
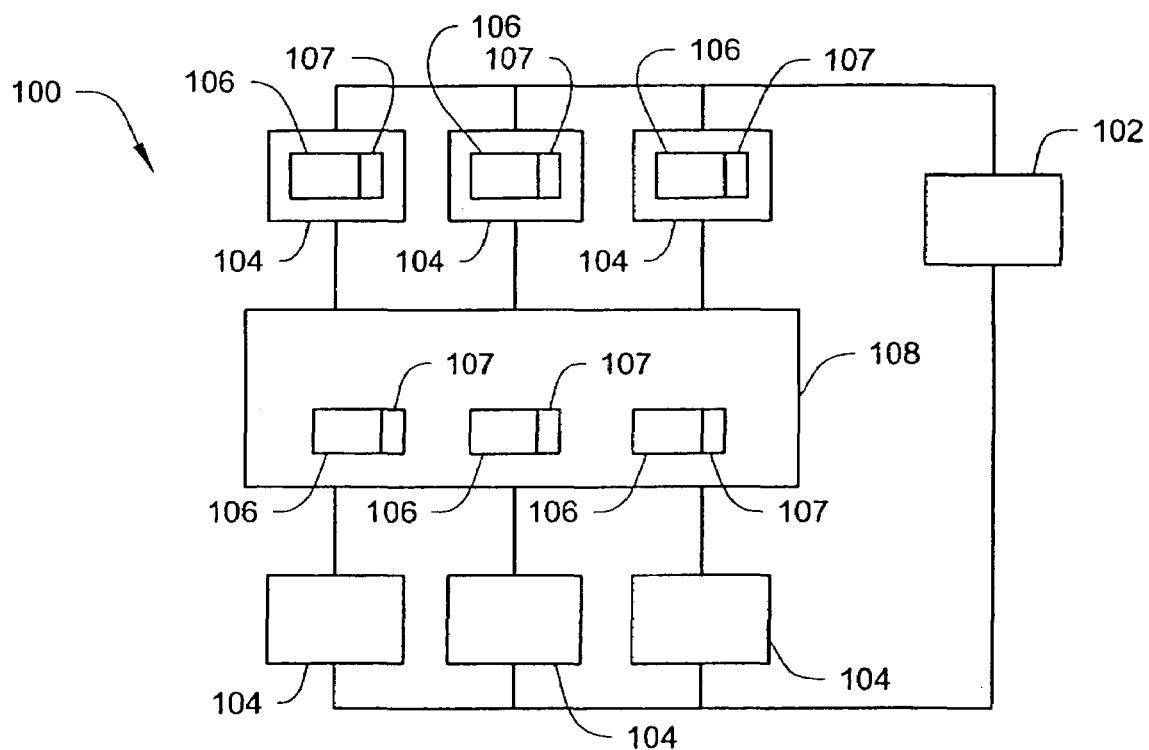
FIG. 1 is a block diagram of one example of one exemplary poultry processing system according to the present invention.

In the following detailed description of illustrative embodiments, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

FIG. 1 is a block diagram that is illustrative of one embodiment of a modular poultry processing system 100 according to the present invention. The system 100 includes a control system 102, processing stations 104, poultry carriers 106, and a conveying system 108. In the depicted embodiment, the control system 102 is operably connected to the processing stations 104 and the conveying system 108.

The processing stations 104 are provided to perform one or more processes on poultry routed to the processing station 104 on poultry carriers 106. Each processing station 104 may perform one or more processes on an individual poultry directed to the processing station 104 by the conveying system 108. Examples of processing stations 104 include, but are not limited to a loading station, a cleaning station, a weighing station, a sexing station, a beak treatment station, a claw treatment station, etc.

As discussed above, processing stations 104 of the present invention may be broadly characterized as data collection stations, functional stations, or both. A data collection station of the present invention is a processing station at which data regarding one or more physical characteristics of poultry may be obtained. Examples of data collection stations include, but are not limited to, weighing stations, sexing stations, imaging stations, etc. A functional station of the present invention is a processing station at which the poultry is changed in one or more aspects. Examples of functional stations include, but are not limited to, beak treatment stations, claw treatment stations, marking stations, cleaning stations, gavage stations, inoculation stations, etc.

The processing systems and processing sequences of the present may preferably include at least one data collection station and at least one functional station. Either type of processing station 104 may preferably be located at any point within the system or, for methods, may preferably be accessed at any time during processing of individual poultry. Furthermore, a single processing station 104 may operate as both a data collection station and a functional station. For example, a single processing station 104 may clean and sex a hatchling or an embryo in an egg.

Processing stations 104 may be operated automatically or manually. By automatic (and its variations) we mean that the process or processes performed at the processing station are carried out in the absence of direct human intervention. For example, a processing station at which the weight of specific poultry is determined may be carried out automatically without the need of direct human intervention by weighing the poultry and its poultry carrier, followed by subtracting the (preferably known) weight of the carrier.

In contrast, a manual processing station requires direct human intervention to perform the process of the processing station. For example, a processing station at which the gender of a hatchling is determined (sometimes referred to as "sexing" a hatchling) may be a manual processing station at which one or more individuals examine the poultry to determine their gender. An automated processing station may be defined as one in which the function is performed without direct human intervention. The potential advantages of an automated processing station may be reduced labor costs, more reliable operation, and faster operation.

The poultry carriers 106 are preferably designed to retain one individual poultry for processing at selected processing stations 104. In the depicted system 100, some of the processing stations 104 are occupied by poultry carriers 106. The poultry carriers 106 may take any suitable shape or form so long as the poultry carriers can be individually routed along the conveying system 108 and can restrain the poultry while it is being transported and processed through the system. Poultry carriers 106 may be provided in different sizes or formats to accommodate different sizes, different breeds, and/or different species of poultry. The poultry carriers 106 may restrain poultry in any suitable manner, e.g., within an enclosure, by capturing any suitable portion or portions of the hatchling's anatomy, use of suction (with, e.g., eggs), etc. Examples of some restraint systems that may be used in connection with the poultry carriers of the present invention designed for hatchlings may be described in, e.g., U.S. Pat. No. 4,375,814 (Gourlandt) and U.S. Pat. No. 5,651,731 (Gorans et al.).

The poultry carriers 106 may each preferably include an identification (ID) tag to identify the poultry carrier 106 to, e.g., the control system 102, each processing station 104, etc. The ID tag 107 may take any suitable form. Examples of some suitable forms may include, but are not limited to barcodes, radio frequency identification (RFID) devices, alphanumeric indicia, etc. The ID tags 107 are depicted as being attached to the poultry carriers 106, but it should be understood that they could alternatively be attached directly to the individual poultry being processed.

In yet another variation, the ID tags 107 may not be provided in a physical embodiment at all, for example, the ID tags 107 may be provided in software used in the method or system. For example, the ID tags 107 may be assigned and tracked in software as the poultry carrier 106 moves within the system.

The automated conveying system 108 is used to transport poultry carriers to the different processing stations 104 of the system 100. The conveying system 108 may preferably be formed using conventional modular conveying systems.

In any processing system of the present invention, each section of the conveying system 108 may be powered and controlled separately if desired. Each section of the conveying system 108 may additionally have some intelligence and may communicate with other sections or the control system 102. A centralized control system may direct the activities and timing of the individual sections of the conveying system 108 or control of the entire conveying system 108 may be distributed to one or more sections of the conveying system 108.

The control system 102 may be used to control the transporting and processing of each poultry carrier 106 in the system. The control system 102 may preferably communicate with each processing station 104 of the plurality of processing stations 104 and the conveying system 108.

The control system 102 may be centralized or distributed. A centralized control system 102 may preferably include a single computing element, in which all computing may be performed by the single computing element (although there may be backup or redundant computing elements that are used if the single computing element fails). A centralized control system 102 may typically include some type of network or bus through which the single computing element may communicate with all the elements of the system 100 that require direction from the control system 102.

A distributed control system 102 may include two or more computing elements controlling different components of the system 100. A distributed control system 102 may typically include a network that interconnects the computing elements with the different components they control and/or other computing elements, such that they may communicate and exchange information.

The control system 102 may preferably control the processing for each poultry carrier 106 in the system, and the transportation of each poultry carrier 106 from one processing station 104 to the next. For example, the control system 102 may communicate with a processing station 104 to configure the processing to be performed, and then may read back the status of the result when the processing is completed. In addition, the control system 102 may communicate with the conveying system 108 to determine a path that a poultry carrier 106 may traverse to be transported from a current processing station 104 to a next processing station 104.

The processing performed on an individual poultry carrier 106 may be defined by the sequence of processing stations 104 that the poultry carrier 106 traverses while in the system 100. The control system 102 may determine the sequence of processing stations 104 for each poultry carrier 106 in the system 100, and further, may control the processing stations 104 and conveying system 108 to perform that processing sequence.

Each processing station 104 may have one or more status signals that may be read by the control system 102. For example, status signals may include, e.g., processing station power on; processing station occupied/available; processing complete; status information related to the specific processing and measurements, and/or a processing station problem alert. Each processing station 104 may be capable of receiving commands from the control system 102 and performing those commands. Example commands may include, e.g., control signals to perform specific processing and measurements; initiate processing; transfer poultry carrier to the conveying system; read the ID tag on the poultry carrier, and/or reset the processing station.

Furthermore, a processing station 104 may be programmable (i.e., be capable of performing several different processes or variations of a process). The control system 102 may determine the specific process to be performed and may send commands to the processing station 104 to configure the processing station 104 to perform the selected process on particular poultry based on, e.g., one or more characteristics of the poultry such as, for example, weight, age, gender, species, etc.

The system 100 of the present invention may preferably provide modularity through the use of standardized dimensions and designs for the poultry carrier 106, the conveying system 108, and the processing station 104 interface to both the poultry carrier 106 and the conveying system 108. The system 100 of the present invention may be based on a building block concept, for example, the conveying system 108 may be formed by combining various types of sections to form the required system.

Therefore, the system 100 of the present invention may preferably accommodate a range of system sizes, in terms of the number of processing stations 104 and the size of the conveying system 108. The size and extent of the conveying system 108 may be increased or decreased. Similarly, the number of processing stations 104 may be increased or decreased.

The conveying system 108 and the processing stations 104 may be arranged to provide serial connections between the different processing stations 104 or they processing stations 104 and conveying system 108 may be arranged to provide for parallel connectivity.

Figure 2:
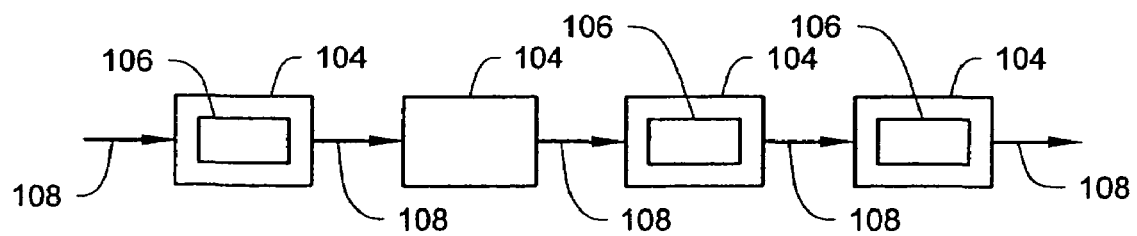
FIG. 2 depicts one example of a system with processing stations in a serial configuration.

One example of processing stations 104 arranged serially is depicted in FIG. 2 in which successive processing stations 104 are connected by portions of the conveying system 108. Some of the processing stations 104 are occupied by poultry carriers 106. In such a system, each poultry carrier 106 moving through the system would pass through all of the processing stations 104. If the process performed at a particular processing station 104 was not selected for particular poultry, the processing station 104 may not be activated while the loaded poultry carrier 106 (i.e., the poultry carrier with selected poultry) is passing through the processing station 104.

Figure 3:
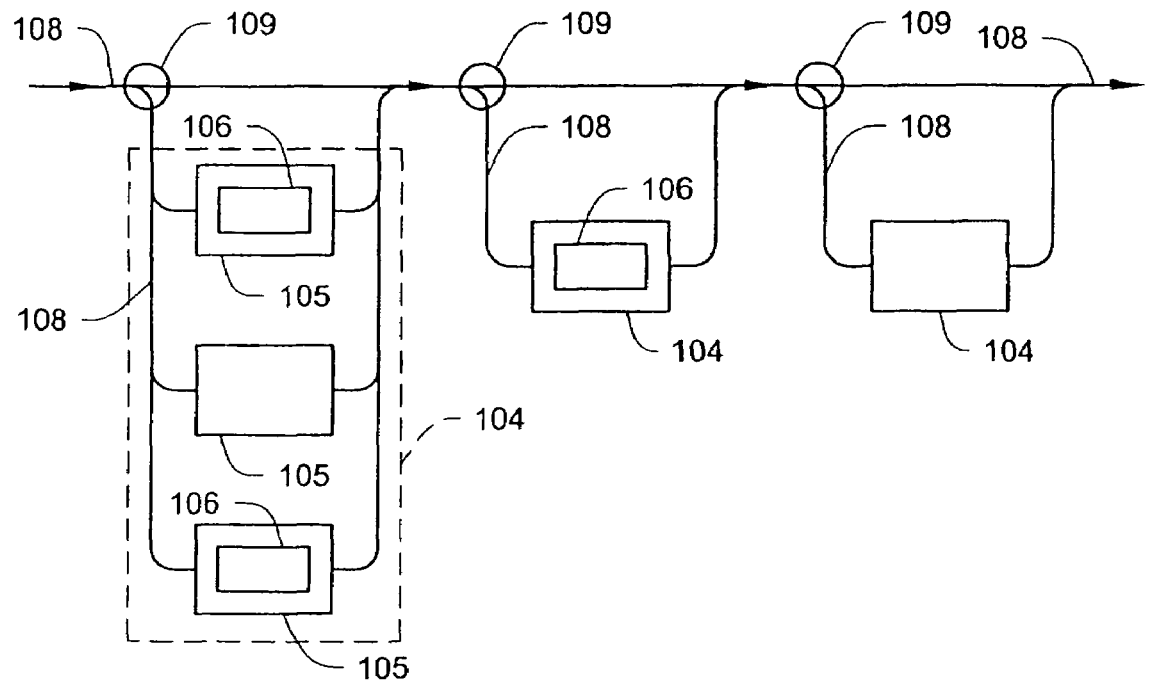
FIG. 3 depicts one example of a system with processing stations in a parallel configuration.

FIG. 3 depicts a system in which the processing stations 104 are arranged in parallel such that one or more of the processing stations 104 can be bypassed by the poultry carriers 106 moving along the conveying system 108. At each of the processing stations 108, a junction 109 is provided that can route the poultry carriers 106 into the processing station 104 or past it without requiring the poultry carrier 106 to pass through the processing station 104.

Another optional feature depicted in FIG. 3 is that the first processing station 104 includes more than one bay 105 in which loaded poultry carriers 106 may be processed at the same time. In the depicted system, two of the bays 105 are occupied by poultry carriers 106. Multiple bays 105 may be provided at a processing station 104 that has, e.g., a longer processing time than the other processing stations 104. As a result, overall throughput of the system can be increased by controlling a potential bottleneck in the flow of poultry carriers 106 processed by the system.

Figure 4:
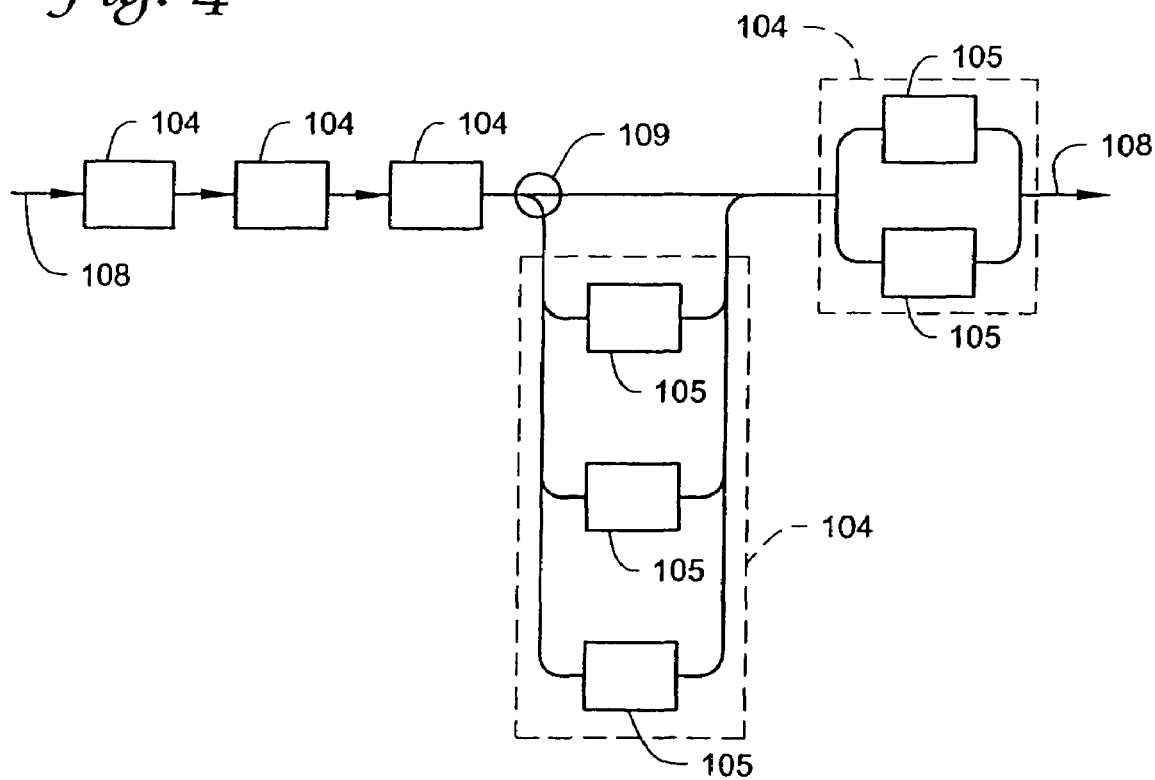
FIG. 4 depicts one example of a system with processing stations that are in both serial and parallel configurations.

FIG. 4 depicts still another option in a processing system according to the present invention in which the first three processing stations 104 are arranged serially and one of the processing stations 104 is arranged in parallel including a junction 109 at which a poultry carrier can either be routed into the processing station 104 (and one of its bays 105) or past the processing station 104.

Another variation also depicted in connection with FIG. 4 is that a serially connected processing station 104 (the last processing station 104 in FIG. 4) can include multiple bays 105 for processing poultry.

FIG. 5 is an expanded view of one embodiment of the control system 102 depicted in FIG. 1. The control system 202 of FIG. 5 may include a control apparatus 212 (e.g., a microprocessor, a personal computer, operating system software, driver software, and/or application software), a poultry database 216, and an interconnection network 210. The control system 202 preferably controls the processing stations 204 and the conveying system 208.

The control apparatus 212 may include, e.g., a computing element 222, a flow control algorithm 214 and a communications interface 218. The control apparatus 212 may perform a variety of operations including, but not limited to: reading status from a processing station; sending a command to a processing station; storing data in the poultry database 216; reading data from the poultry database 216; determining a processing sequence for a loaded poultry carrier, etc.

Through the use of the flow control algorithm 214, the control apparatus 212 may control the movement of poultry carriers through the processing stations 204 and the processes performed on the poultry in the poultry carriers. The flow control algorithm 214 may determine a processing sequence for each poultry carrier through the various processing stations 204. In other words, the processing sequence of a poultry carrier is the sequence of processing stations at which the poultry in a loaded poultry carrier undergoes processing.

The poultry database 216 may be used to store and access information regarding one or more characteristics of the poultry in a poultry carrier, as identified, for example, by the ID tag. The poultry database 216 may also be used to store the results of the processing of the poultry as reported by the various processing stations 204. The poultry database 216 may preferably be managed by the control apparatus 212, through which all the reads and writes to the poultry database 216 may be performed. The poultry database 216 may be formed using any suitable database techniques known to one skilled in the art. In one embodiment, the poultry database 216 may be used to gather and provide statistical data with respect to the poultry processed through the system.

Generally, the flow control algorithm 214 may determine, for each poultry carrier, the sequence of processing stations the poultry carrier may visit. The flow control algorithm 214 may also be used to control throughput such that the capacity of the system is not exceeded, i.e., that the number of poultry carriers in the system does not exceed the capacity of the system. The flow control algorithm 214 may be defined by the user, providing flexibility in how poultry may be processed. The flow control algorithm 214 may include the capability to make decisions regarding the next station or stations to which a loaded poultry carrier may be sent, based on the previous processing of the loaded poultry carrier as reflected by data stored in the poultry database 216. In other words, the decision of next processing station for a given poultry carrier may depend on the results of processing in one or more of the previous processing stations visited by the poultry carrier. This provides a capability to optimize the processing of individual poultry based on the characteristics of the individual poultry.

Alternatively, the flow control algorithm 214 may be static such that each loaded poultry carrier flows through exactly the same processing sequence. As another example, the flow control algorithm 214 may be dynamic, such that for each processing station visited, when the processing is complete, the control system 202 may determine one or more of the successive processing stations for each loaded poultry carrier based on the processing of the poultry carrier up to that point. The determination may be made with reference to the poultry database 216 to access the previous results for that poultry carrier. Alternatively, such decisions may be made based on information encoded on the poultry carrier or the poultry itself.

The flow control algorithm 214 may preferably be capable of defining all the possible processing sequences that may occur in a system. Each unique path through the flow control algorithm 214 may define a possible processing sequence for a poultry carrier. Poultry in a poultry carrier may be associated with a processing sequence that includes all the processing stations at which the poultry carrier undergoes processing as determined by the flow control algorithm 214, and may be further determined by the characteristics of the specific poultry.

It may be desirable that the conveying system 208 be capable of providing the paths that are called for by the processing control algorithm 214. In other words, whatever next processing station decisions are made by the flow control algorithm 214, the conveying system 208 may preferably be capable of providing a path from the current processing station to the next processing station as determined by the flow control algorithm 214. The conveying system 208 may be preferably modular such that it may be modified to provide the connectivity called for by the flow control algorithm 214.

The control apparatus 212 may preferably include a communications interface 218 that interfaces the external interconnection network 210 to the control apparatus 212. The interconnection network 210 connects to the processing stations 204 and conveying system 208. The interconnection network 210 may provide a communication path between the processing stations 204 and the control apparatus 212, and between the conveying system 208 and the control apparatus 212. As the control apparatus 212 executes the flow control algorithm 214, the control apparatus 212 may receive status information and send command information to both the processing stations 204 and the conveying system 208, to facilitate processing of each of the loaded poultry carriers processing in the system.

As discussed herein, the poultry carriers may include an ID tag to identify the poultry carriers (and preferably the poultry within them) as the loaded poultry carriers are processed through the system. This ID tag may be used by the control system 202 to identify the poultry carrier, and the data associated with it. For example, the data generated by processing stations for a specific poultry carrier may be stored in the poultry database 216 using the ID tag as an addressing label. Later, the data associated with the poultry carrier may be accessed using the ID tag. The ID tag may be the mechanism used to store and access data related to a particular poultry carrier, and may provide individualized processing (if desired) for each poultry carrier.

FIG. 6 represents only one illustrative embodiment of a general flow control algorithm 400 that could potentially be used with poultry carriers that include an ID tag. This flow control algorithm 400 may be used to determine the processing sequence of each loaded poultry carrier through the system. The description of FIG. 6 will be given with respect to one poultry carrier, however, in the poultry processing system, the flow control algorithm may preferably concurrently provide control for each poultry carrier in the system.

The embodiment depicted in FIG. 6 illustrates operation of the control system beginning with a poultry carrier being processed in processing station 1 (block 465). After the control system initiates the processing in processing station 1, the control system may monitor the status of processing station 1 to determine when the processing is completed. When the processing in processing station 1 is completed, the control system may read the status from processing station 1 to obtain the results of the processing and may store the results in the poultry database (block 469).

As further shown in FIG. 6, the control system may determine the next processing station for the poultry carrier currently in station 1 (block 470). This determination may be made taking into consideration the results of the processing in station 1, along with previous status and results related to the poultry carrier (if any) as stored in the poultry database. Thus, the flow control algorithm 400 may be dynamic in that the next processing station may not be determined until processing at the current processing station is completed.

Once the next processing station has been determined (in FIG. 6 the next processing station is referred to as processing station 2), the control system may read the status of processing station 2 to determine if the station is busy or available. If processing station 2 is busy, the control system may continue to monitor until the processing station 2 becomes available. Once processing station 2 is available, the control system may perform a setup of the conveying system path from processing station 1 to processing station 2 (block 475). Next, the control system may send a command to processing station 1 to transfer the poultry carrier out of processing station 1 and onto the conveying system (block 476). The conveying system may transport the poultry carrier from processing station 1 to processing station 2. Once the poultry carrier arrives in processing station 2, the control system may send a command to processing station 2 to read the ID tag of the poultry carrier (block 481). The control system may receive the ID tag information and store it in the poultry database. Next, the control system may configure processing station 2 to perform the processing on the poultry carrier (block 482). Then, the control system may send a command to initiate the processing in processing station 2 (block 483). The flow control algorithm of FIG. 6 ends at block 484, however, the algorithm may repeat (e.g., in this example, the flow control algorithm may repeat, however, now block 465 begins with processing station 2).

A flow control algorithm may include any resource scheduling or resource management techniques known to one skilled in the art.

FIG. 7 is a flow diagram illustrating only one embodiment of a flow control algorithm 500 and a related processing sequence 598. FIG. 7 defines a series of processing stations that a poultry carrier may visit and, for each station visited, how to determine the next processing station for that poultry carrier. FIG. 7 will be described for use with a centralized control system, although any type of control system known to one skilled in the art, including a centralized control system or a distributed control system, may be used. The description will be given with respect to one poultry carrier, however, in the poultry processing system, the control system may preferably concurrently provide control for each poultry carrier in the system.

As shown in FIG. 7, the flow control algorithm 500 defines how to determine the next processing station for each poultry carrier. In contrast, the processing sequence 598 of a poultry carrier is the sequence of processing stations that a specific poultry carrier visits. In other words, the set of possible processing sequences that any particular poultry carrier may take corresponds to the set of possible paths through the flow control algorithm.

For example, the processing sequence 598 shown in FIG. 7 includes a loading station 586; a cleaning station 587; a weighing station 588; an automated sexing station 589; a manual sexing station 590; an imaging station 591; a beak treatment station 592; a claw treatment station 593; and an unloading station 596.

The flow control algorithm 500 may begin with individual poultry 585 to be processed. The first station, a loading station 586, may load individual poultry 585 into a poultry carrier. The poultry carrier both constrains and positions the poultry. The poultry may be restrained in a fixed position within the poultry carrier to facilitate later processing steps. The loading station 586 may be manual, such that a person places the poultry into the poultry carrier, or it may be automated such that the loading station 586 includes a mechanism to capture and manipulate individual poultry, and place the poultry in a poultry carrier. Placing the poultry in a poultry carrier provides a mechanism for transporting the poultry from one processing station to the next, and also provides a standard method for each processing station to receive and access the poultry. The poultry carrier may also provide singulation such that each processing station does not need to separate or untangle two or more poultry.

For example, a loading station 586 may access a group of poultry stored in a shed, to capture individual poultry and convey the poultry into a poultry carrier. One example of a loading station 586 is described in U.S. Pat. No. 6,443,102 (Schepers et al.).

After the poultry has been loaded into poultry carriers at the loading station 586, the loading station 586 may provide information to the control system related to the process. For example, such information may include the ID tag of the poultry carrier, the time the poultry was loaded into the poultry carrier, species of the poultry, a batch number, source code (indicating the provider of the poultry), etc.

Following the loading station 586 processing, the flow control algorithm of FIG. 7 may determine that the next processing station is the cleaning station 587. The control system may perform the operations as described in FIG. 6 to transfer the poultry carrier from the loading station 586 to the cleaning station 587. The cleaning station may be used to remove dirt and excrement from the poultry to, e.g., facilitate further processing. The cleaning station 587 accesses the poultry for cleaning, and then performs the cleaning.

As further shown in FIG. 7, the flow control algorithm may determine that the next processing station may be the weighing station 588. The control system may perform the operations as described in FIG. 6 to transfer the poultry carrier from the cleaning station 587 to the weighing station 588. The weighing station 588 may perform a measurement to determine the weight of the poultry. The weighing station 588 may access the poultry and perform a measurement of the poultry's weight.

After the poultry has been weighed, the weighing station 588 may provide information to the control system related to the process. For example, such information may include the ID tag of the poultry carrier and the weight of the poultry. Thereafter, the weight of the poultry may be available as data for subsequent processing stations, which may use the weight as information to optimize the processing.

Following the weighing station 588 process, the flow control algorithm of FIG. 7 may determine that the next processing station may be an automated sexing station. As shown in FIG. 7, the system includes three separate bays 589, 600, and 601. The use of multiple bays may be beneficial, for providing an increased processing rate for the system. For example, if the duration of the processing time for the automated sexing station was significantly longer than the processing times of other types of stations in the system, multiple automated sexing bays may be used as shown in FIG. 7 to decrease the effective processing time. This technique may be used with most types of processing stations.

In FIG. 7, automated sexing station is determined to be the next processing station. The control system may perform the operations as described in FIG. 6 to transfer the poultry carrier from the weighing station 588 to one of the bays 589, 600, 601 of the automated sexing station.

There are many advantages to sexing poultry. For example, in the chicken broiler industry, the growth characteristics of the male and female chickens are different. The males tend to grow faster and larger at given conditions. Thus, raising male and female chickens separately may be advantageous. Another potential advantage of sexing may be processing line efficiency. With the poultry sorted by sex, the processing line handling the males may be configured to handle larger poultry efficiently, and corresponding, the processing line handling the females may be configured to handle smaller poultry. When the system provides more uniform sized poultry to the equipment, the equipment may provide improved yield, efficiency, and productivity.

Some examples of an automated sexing station 589 for poultry are described in U.S. Pat. No. 6,396,938 (Tao et al.); U.S. Pat. No. 6,512,839 (Toelken), U.S. Pat. No. 4,417,663 (Suzuki); and U.S. Patent Application Publication US2001/0035370 (Yavnai et al.).

After processing in the automated sexing station such that the gender of the poultry may be determined, the automated sexing station may provide information to the control system related to the operation. For example, such information may include the ID tag of the poultry carrier and the gender of the poultry. Thereafter, the gender of the poultry may be available as data to future processing stations, which may use the gender of the poultry as information to optimize the processing.

As further shown in FIG. 7, the flow control algorithm may determine the next processing station for the poultry carrier. In this case, the flow control algorithm may access the information written into the poultry database to determine the next processing station 570. If the poultry database information indicates that the gender was determined, then the next processing station may be the imaging station 591.

In some instances, the automated sexing station was unable to determine the gender of the poultry. If the gender of the poultry was not determined by the automated sexing stations, then the next processing station may be a manual sexing station 590. In FIG. 7, the automated sexing station was unable to determine the sex of the poultry 572 and therefore the next processing station may be the manual sexing station 590. The control system may perform the operations as described in FIG. 6 to transfer the poultry carrier from the automated sexing station to the manual sexing station 590.

Manual sexing stations 590 may provide for the gender of the poultry to be determined manually by a person. The person may typically access the poultry through or in the poultry carrier and make a determination of the gender. Once the gender of the poultry has been determined, the person may input information to the control system related to the operation. For example, such information may include the ID tag of the poultry carrier and the gender of the poultry.

As an alternative to a manual sexing station for those poultry that cannot be accurately sexed in their first pass through an automated sexing station, the system may route such poultry (and their poultry carriers) to a holding or staging area. In some instances, sexing operations may be more successful as the poultry ages. As a result, waiting for a period of time may allow poultry that was not accurately sexed during the first pass to be sexed during a later pass through an automated sexing station. Such a system may obviate the need for a backup manual sexing station.

After the gender of the poultry has been determined, the flow control algorithm of FIG. 7 indicates that the next processing station may be the imaging station 591. As shown in FIG. 7, the control system may perform the operations as described in FIG. 6 to transfer the poultry carrier from the manual sexing station 590 to an imaging station 591.

The imaging station 591 may be used to form images of the poultry, where the images represent some aspect of the poultry. These images may be formed using a variety of methods. For example, the image may be a photograph, or the image may be formed using ultrasound, ultraviolet light, infrared light, or any other image forming method. The imaging station may preferably access and position the poultry to form the desired image. In addition, image processing may be performed to determine some trait or characteristic of the poultry, for example, some physical trait or abnormality.

Once the imaging and any selected image processing are completed, the imaging station 591 may provide information to the control system related to the operation. For example, such information may include the ID tag of the poultry carrier, one or more images of the poultry, and traits or characteristics of the poultry determined from image processing.

It should be understood that imaging may be performed at other points within the systems and methods of the present invention. For example, an imaging station may be used before poultry enters any of the processing stations or at least as the poultry is loaded into poultry carriers. Such "pre-processing" imaging may be used to, e.g., grade poultry based on physical abnormalities, size, etc. and that information may be used to, e.g., place poultry in a different size poultry carrier, prevent the poultry from entering the system, etc.

Imaging may also be used after processing poultry to determine whether, e.g., the poultry was properly processed. Such "post-processing" imaging may be used to verify that poultry was properly treated within, e.g., a beak treatment station, claw treatment station, cleaning station, marking station, etc. If the imaging indicates that treatment was not performed properly, the poultry could potentially be routed back through the same process, an alarm may be tripped (e.g., audible, visual, etc.) to indicate that a processing station may not be operating within acceptable parameters, the poultry could be directed to a holding/staging station, etc.

After the imaging station 591 processing is completed, the flow control algorithm of FIG. 7 may determine that the next processing station will be the beak treatment station 592. The control system may then perform the operations as described in FIG. 6 to transfer the poultry carrier from the imaging station 591 to the beak treatment station 592.

One example of a beak treatment station is described in U.S. Pat. No. 5,651,731 (Gorans et al.). Other examples of beak treatment stations 592 are described in U.S. Pat. Nos. 4,375,814; 4,446,819; and 4,951,610 (all to Gourlandt). It should be understood that in some instances, the beak treatment station 592 may involve treatment of the upper beak alone, the lower beak alone, or the upper and lower beaks (either simultaneously or sequentially). Examples of beak treatment stations may also be described in, e.g., U.S. patent application Ser. No. 10/346,981 titled APPARATUS AND METHOD FOR UPPER AND LOWER BEAK TREATMENT, filed Jan. 17, 2003 and U.S. patent application Ser. No. 10/702,369, titled BEAK TREATMENT WITH TONGUE PROTECTION, filed on Nov. 6, 2003.

Following the beak treatment process, the beak treatment 592 station may provide information to the control system related to the operation. For example, such information may include the ID tag of the poultry carrier.

After the beak treatment station 592 operation has been completed, the flow control algorithm of FIG. 7 may determine that the next processing station may be the claw treatment station 593. The control system may perform the operations as described in FIG. 6 to transfer the poultry carrier from the beak treatment station 592 to the claw treatment station 593.

The claw treatment station may preferably access and position the poultry to perform the claw treatment. One example of a claw treatment station 593 is described in U.S. Pat. No. 5,195,925 (Gorans et al.). Once the claw treatment is completed, the claw treatment station 593 may provide information to the control system related to the operation. For example, such information may include the ID tag of the poultry carrier.

After the claw treatment station 593 processing has been completed, the flow control algorithm of FIG. 7 may determine the next processing station for the poultry carrier. The flow control algorithm may access status information related to unloading station 596, to determine whether unloading station 596 contains a poultry carrier or not 573. If the unloading station 596 is ready to receive a poultry carrier 574, the next processing station may be the unloading station 596. If the unloading station is not ready to receive another poultry carrier 575, then the next processing station may be the holding/staging station 594. In FIG. 7, the unloading station 596 is ready to receive a poultry carrier, so the next processing station will be the unloading station 596. The control system may perform the operations as described in FIG. 6 to transfer the poultry carrier from the claw treatment station 593 to the unloading station 596.

The unloading station 596 may remove the poultry from the poultry carrier and may place the processed poultry in some type of container. The output of the unloading station 596 may be to place processed poultry in some type of container 597. An example of an unloading station 596 would be a boxing station, in which poultry may be removed from the poultry carrier and placed in a box. The unloading station 596 may be manual, such that a person removes the poultry from the poultry carrier and places it in the shipping container, or it may be automated such that the unloading station includes a mechanism to remove the poultry from the poultry carrier and place the poultry in a container.

After the poultry has been unloaded from the poultry carrier and loaded into a container, the unloading station 596 may provide information to the control system related to the operation. For example, such information may include the ID tag of the poultry carrier and the time the poultry was unloaded from the poultry carrier.

In some systems and methods, it may be preferred to segregate poultry at the unloading station 596 based on one or more physical characteristics (e.g., gender, size, etc.) and/or based on one or more processes that may have been performed on the poultry (e.g., inoculations, beak treatments, claw treatments, etc.). Such segregation may provide an opportunity for the processor to provide poultry that meet some desired criteria based on physical characteristics, processes performed on the poultry, etc.

FIG. 7 also depicts a holding/staging station 594, which was not part of the processing sequence 598, but is included in the flow control algorithm 500. A holding/staging station 594 may be used, for example, as a temporary holding area for poultry carriers awaiting subsequent processing. For example, in FIG. 7, the holding/staging station 594 may be used to hold poultry carriers waiting to move to the unloading station 596.

In other systems/methods, a holding/staging station could be used at any point in the processing of poultry to, e.g., age poultry if the accuracy of an automated sexing operation could be increased with age. In still other systems/methods, a separate holding/staging station could be used to provide time for analysis of data collected at different station, to provide time for analysis or testing of tissue collected from poultry at a different station, to provide time for an agent introduced into a bird or embryo to act (e.g., a pharmaceutical agent, etc.), or for any other purpose for which it is desired to retain control over individual, identifiable poultry within the system/method.

Once a poultry carrier enters the holding/staging station 594, the holding/staging station 594 may provide information to the control system related to the operation. For example, such information may include the ID tag of the poultry carrier and the time the poultry entered the holding/staging station.

Additional examples of types of processing stations that may be used in the system include, but are not limited to inoculation stations (such as, for example, the stations described in U.S. patent application Ser. No. 10/702,988, titled APPARATUS AND METHODS FOR NASAL DELIVERY OF COMPOSITIONS TO BIRDS, filed on Nov. 6, 2003, gavage stations, marking stations, tissue sampling stations, diagnostic stations, etc.

All references cited herein are incorporated in their entirety as if each were incorporated separately. This invention has been described with reference to illustrative embodiments and is not meant to be construed in a limiting sense. Various modifications of the illustrative embodiments, as well as additional embodiments of the invention, will be apparent to persons skilled in the art upon reference to this description.

The invention claimed is:

1. A method for processing poultry, the method comprising:
   loading individual poultry into each poultry carrier of a plurality of poultry carriers to provide a plurality of loaded poultry carriers, wherein each loaded poultry carrier is capable of restraining only one individual poultry at a time;
   assigning an identification tag to each poultry carrier;
   determining a processing sequence in a processing system comprising a plurality of processing stations for each loaded poultry carrier, wherein determining the processing sequence comprises selecting two or more of the processing stations at which the poultry will undergo processing;
   processing the individual poultry in each of the loaded poultry carriers in the two or more selected processing stations of the processing sequence; and
   transporting each loaded poultry carrier between the two or more processing stations using an automated conveying system connecting the plurality of processing stations;
   wherein the processing sequences for two or more of the loaded poultry carriers are different.

2. A method according to claim 1, wherein the plurality of processing stations comprises at least one data collection station at which poultry data is collected and at least one functional station at which poultry is changed, and further wherein selecting two or more of the processing stations at which the individual poultry will undergo processing comprises selecting at least one data collection station and at least one functional station.

3. A method according to claim 1, further comprising assigning the identification tag to the poultry carrier after loading the poultry carrier, wherein at least a portion of the identification tag is based on a characteristic of the individual poultry in the loaded poultry carrier.

4. A method according to claim 1, wherein determining the processing sequence for the individual poultry in each loaded poultry carriers comprises selecting at least one of the two or more processing stations at which the individual poultry will undergo processing after processing the individual poultry in at least one of the two or more processing stations of the processing sequence.

5. A method according to claim 1, wherein the transporting comprises transporting each loaded poultry carrier through all of the processing stations of the plurality of processing stations, and further wherein each loaded poultry carrier is processed only at the selected two or more processing stations of the processing sequence for that loaded poultry carrier.

6. A method according to claim 1, further comprising identifying a characteristic of each individual poultry in the loaded poultry carriers, wherein determining the processing sequence is at least partially based on the identified characteristic of the individual poultry in the loaded poultry carrier.

7. A method according to claim 6, wherein the identified characteristic comprises weight of the poultry.

8. A method according to claim 6, wherein the identified characteristic comprises gender of the poultry.

9. A method for processing poultry, the method comprising:
   loading individual poultry into each poultry carrier of a plurality of poultry carriers to provide a plurality of loaded poultry carriers, wherein each loaded poultry carrier is capable of restraining only one individual poultry at a time;
   determining a processing sequence in a processing system comprising a plurality of processing stations for each loaded poultry carrier, wherein determining the processing sequence comprises selecting two or more of the processing stations at which the poultry will undergo processing;
   processing the individual poultry in each of the loaded poultry carriers in the two or more selected processing stations of the processing sequence; and
   transporting each loaded poultry carrier between the two or more processing stations using an automated conveying system connecting the plurality of processing stations;
   wherein the processing sequences for two or more of the loaded poultry carriers are different, and wherein determining the processing sequence for the individual poultry in each loaded poultry carrier comprises selecting the two or more processing stations at which the individual poultry will undergo processing before processing the individual poultry at any of the selected processing stations of the processing sequence.

10. A method according to claim 9, wherein the plurality of processing stations comprises at least one data collection station at which poultry data is collected and at least one functional station at which poultry is changed, and further wherein selecting two or more of the processing stations at which the individual poultry will undergo processing comprises selecting at least one data collection station and at least one functional station.

11. A method according to claim 9, further comprising assigning an identification tag to the poultry carrier after loading the poultry carrier, wherein at least a portion of the identification tag is based on a characteristic of the individual poultry in the loaded poultry carrier.

12. A method according to claim 9, wherein the transporting comprises transporting each loaded poultry carrier through all of the processing stations of the plurality of processing stations, and further wherein each loaded poultry carrier is processed only at the selected two or more processing stations of the processing sequence for that loaded poultry carrier.

13. A method according to claim 9, further comprising identifying a characteristic of each individual poultry in the loaded poultry carriers, wherein determining the processing sequence is at least partially based on the identified characteristic of the individual poultry in the loaded poultry carrier.

14. A method according to claim 13, wherein the identified characteristic comprises weight of the poultry.

15. A method according to claim 13, wherein the identified characteristic comprises gender of the poultry.

16. A method for processing poultry, the method comprising:
   loading individual poultry into each poultry carrier of a plurality of poultry carriers to provide a plurality of loaded poultry carriers, wherein each loaded poultry carrier is capable of restraining only one individual poultry at a time;
   determining a processing sequence in a processing system comprising a plurality of processing stations for each loaded poultry carrier, wherein determining the processing sequence comprises selecting two or more of the processing stations at which the poultry will undergo processing;
   processing the individual poultry in each of the loaded poultry carriers in the two or more selected processing stations of the processing sequence; and
   transporting each loaded poultry carrier between the two or more processing stations using an automated conveying system connecting the plurality of processing stations;
   wherein the processing sequences for two or more of the loaded poultry carriers are different, and wherein the transporting comprises transporting each loaded poultry carrier only to the selected two or more processing stations of the processing sequence for the loaded poultry carrier.

17. A method according to claim 16, wherein the plurality of processing stations comprises at least one data collection station at which poultry data is collected and at least one functional station at which poultry is changed, and further wherein selecting two or more of the processing stations at which the individual poultry will undergo processing comprises selecting at least one data collection station and at least one functional station.

18. A method according to claim 16, further comprising assigning an identification tag to the poultry carrier after loading the poultry carrier, wherein at least a portion of the identification tag is based on a characteristic of the individual poultry in the loaded poultry carrier.

19. A method according to claim 16, wherein determining the processing sequence for the individual poultry in each loaded poultry carriers comprises selecting at least one of the two or more processing stations at which the individual poultry will undergo processing after processing the individual poultry in at least one of the two or more processing stations of the processing sequence.

20. A method according to claim 16, further comprising identifying a characteristic of each individual poultry in the loaded poultry carriers, wherein determining the processing sequence is at least partially based on the identified characteristic of the individual poultry in the loaded poultry carrier.

21. A method according to claim 20, wherein the identified characteristic comprises weight of the poultry.

22. A method according to claim 20, wherein the identified characteristic comprises gender of the poultry.

23. A method for processing poultry, the method comprising:
   loading individual poultry into each poultry carrier of a plurality of poultry carriers to provide a plurality of loaded poultry carriers, wherein each loaded poultry carrier is capable of restraining only one individual poultry at a time;
   assigning an identification tag to each poultry carrier;
   transporting each loaded poultry carrier using an automated conveying system connecting a plurality of processing stations;
   identifying a characteristic of the individual poultry in each of the loaded poultry carriers at one processing station of the plurality of processing stations;
   determining whether to process the individual poultry in each of the loaded poultry carriers at a particular processing station of the plurality of processing stations as the loaded poultry carrier approaches or is located within the particular processing station, wherein the determining is based at least partially on the identified characteristic of the individual poultry in the loaded poultry carrier; and processing the individual poultry in each of the loaded poultry carriers in two or more selected processing stations of the plurality of processing stations, wherein the selected processing stations for the individual poultry in each of the loaded poultry carriers comprises a processing sequence for the individual poultry;

wherein the processing sequences for two or more of the loaded poultry carriers are different.

24. A method according to claim 23, wherein the plurality of processing stations comprises at least one data collection station at which poultry data is collected and at least one functional station at which poultry processed by the functional station is changed, and further wherein the processing sequence for each loaded poultry carrier of the plurality of loaded poultry carriers comprises at least one data collection station and at least one functional station.

25. A method according to claim 23, further comprising assigning the identification tag to the poultry carrier after loading the poultry carrier, wherein at least a portion of the identification tag is based on a characteristic of the individual poultry in the loaded poultry carrier.

26. A method according to claim 23, wherein the identified characteristic comprises weight of the poultry.

27. A method according to claim 23, wherein the identified characteristic comprises gender of the poultry.

28. A method for processing poultry, the method comprising:

loading individual poultry into each poultry carrier of a plurality of poultry carriers to provide a plurality of loaded poultry carriers, wherein each loaded poultry carrier is capable of restraining only one individual poultry at a time;

transporting each loaded poultry carrier using an automated conveying system connecting a plurality of processing stations;

identifying a characteristic of the individual poultry in each of the loaded poultry carriers at one processing station of the plurality of processing stations;

determining whether to process the individual poultry in each of the loaded poultry carriers at a particular processing station of the plurality of processing stations as the loaded poultry carrier approaches or is located within the particular processing station, wherein the determining is based at least partially on the identified characteristic of the individual poultry in the loaded poultry carrier; and processing the individual poultry in each of the loaded poultry carriers in two or more selected processing stations of the plurality of processing stations, wherein the selected processing stations for the individual poultry in each of the loaded poultry carriers comprises a processing sequence for the individual poultry;

wherein the processing sequences for two or more of the loaded poultry carriers are different and wherein the transporting comprises transporting each loaded poultry carrier only to the selected processing stations of the processing sequence for the loaded poultry carrier.

29. A method according to claim 28, wherein the plurality of processing stations comprises at least one data collection station at which poultry data is collected and at least one functional station at which poultry processed by the functional station is changed, and further wherein the processing sequence for each loaded poultry carrier of the plurality of loaded poultry carriers comprises at least one data collection station and at least one functional station.

30. A method according to claim 28, further comprising assigning an identification tag to the poultry carrier after loading the poultry carrier, wherein at least a portion of the identification tag is based on a characteristic of the individual poultry in the loaded poultry carrier.

31. A method according to claim 28, wherein the identified characteristic comprises weight of the poultry.

32. A method according to claim 28, wherein the identified characteristic comprises gender of the poultry.

* * * * *